Figure 1:
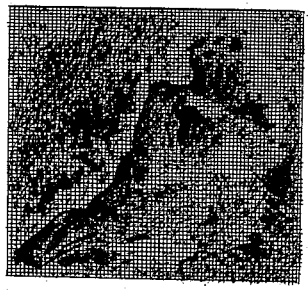

No. 853,863. PATENTED MAY 14, 1907.
T. A. & J. B. CONNOLLY.
METHOD OF PRODUCING PICTURES, DESIGNS, &c.
APPLICATION FILED OCT. 4, 1906.

WITNESSES:

INVENTORS:
Thomas A. Connolly
Joseph B. Connolly

UNITED STATES PATENT OFFICE.

THOMAS A. CONNOLLY AND JOSEPH B. CONNOLLY, OF WASHINGTON, DISTRICT OF COLUMBIA.

METHOD OF PRODUCING PICTURES, DESIGNS, &c.

No. 853,863.

Specification of Letters Patent.

Patented May 14, 1907.

Application filed October 4, 1906. Serial No. 337,480.

*To all whom it may concern:*

Be it known that we, THOMAS A. CONNOLLY and JOSEPH B. CONNOLLY, citizens of the United States, residing at Washington, in the District of Columbia, have invented certain new and useful Improvements in Methods of Producing Pictures, Designs, &c., of which the following is a specification.

Our invention has relation to photography and photo-mechanical processes, and has for its object the provision of novel methods for the photo-mechanical production of prints or impressions similar in appearance to photo-lithographic or half tone work and having the characteristics of both, the means and methods employed by us being comparatively simple and inexpensive and of such a nature as to be easily practiced without the use of expensive apparatus or the employment of more than ordinary skill.

Our invention is believed to be meritorious both for artistic and industrial purposes.

Our invention relates primarily to the production and utilization of a pigment distributing medium in the nature of a pervious film or web bearing an image of the pictorial object to be printed and formed by photographic means, such film or web being used to distribute pigment or color for printing purposes upon a surface which can either be a printing surface from which impressions may be taken or a sheet which will be itself the pictorial representation or print.

Our invention relates, furthermore, to the provision and utilization as a printing surface, or surface from which prints or impressions in pigment may be taken, of an absorbent material, such as gelatin and glycerin combined and forming a gelatinous mass, which being charged with the proper pigment distributed upon it by means of a photographically produced pervious film or web, will give repeated prints or impressions without the necessity of re-inking the surface for each impression. This second feature of our invention involves the application and use for photo-mechanical purposes of a duplicating apparatus, such as a hectograph, which may be made according to any of the well known methods for producing hectographic printing surfaces, and the novelty in its use and application in our invention consists in charging such hectograph with pigment or coloring matter through the medium of a photo- graphically produced device in the nature of a stencil or other photographically produced sheet, film or web, through which pigment corresponding in its pictorial characteristics to the subject photographed, may be conveyed to the hectographic surface and so impressed upon or caused to be absorbed therein as to give repeated prints or impressions.

Our invention accordingly consists, first, in the provision, as an expedient in photo-mechanical processes, of a web, film or its equivalent of a pervious nature which may be used as a medium for conveying and distributing coloring matter to and over a suitable surface, such film or web being in fact a photographically produced stencil capable of being handled without injury to the substance of which it is composed and which may be laid upon a surface, such as a sheet of paper or hectograph, and the surface upon which it is laid then imprinted by the passage through the open or pervious portions of the web of suitable pigment or coloring matter. Second, in the method or process of producing such films, webs or stencils. Third, in the method of utilizing such webs, films or stencils, either for impressing the surface to produce a print or impression direct, or for charging a body or surface, such as a hectograph, with pigment from which prints or impressions may afterward be taken.

Our invention is based on the discovery that if a sheet of suitable material, such as an open work fabric, like bolting cloth, wire gauze, netting, perforated paper, or other pervious or perforate material, is coated with a photo-sensitive substance, such as bichromatized gelatin, glue or gum, and exposed under a photographic plate or other partially transparent subject, or in a camera, and then washed, the soluble portions will be removed in proportion to the degree which they have been affected by the light, while the insoluble portions will remain adherent to the web or foundation sheet and will present an image or pattern of the subject photographed or copied, such pattern or pictorial image being made up of closed and open portions of the web, the web becoming in fact a stencil or reticulated copy of the subject from which it has been photographically produced.

Our invention is further based on the fact that a sheet or web so treated, as above described, may be utilized as a medium for imposing coloring matter upon a suitable receptive surface, from which other copies may be taken, and that the passage of coloring matter or pigment through the photographically produced pervious web may be effected under conditions heretofore unknown in the photographic or photo-mechanical arts and with effects marvelously fine and attractive.

More briefly stated, but without intending to limit ourselves more than the state of the art or the importance of our invention demands, our invention consists in producing a photographic stencil, and taking impressions of the object photographically formed on the stencil.

In carrying our invention into effect for the production of the photographic stencil, we proceed as follows: We coat a suitable net work or open woven fabric, such as bolting cloth which we have found best adapted for the purpose, with a suitable photo-sensitive substance, such as bichromatized gelatin, or glue, so as to entirely fill the pores of the cloth and leave a smooth, even surface and then after the coating is dry expose such sheet to the action of light under the subject to be copied, such as a photographic negative or positive or a sheet of paper upon which the subject or matter to be copied has been printed or impressed.

The result of the actinic action of the light will be the same as in photographically printing a bichromatized film for other photo-mechanical purposes, certain portions of the sensitized coating being rendered insoluble by the action of the light and others rendered partially insoluble according to the degree of light to which they have been subjected. After exposure we remove all the soluble and parts of the partially soluble portion of the coating by washing in water, thus leaving the web partially closed and partially open, the relation, size and distribution of the open and closed portions being such that the web becomes an open transparency or stencil. Where the web or film has been exposed to the highest lights and its sensitized coating rendered insoluble, the washing of the web leaves such parts of the film solid and adherent to the fabric. Other portions which have been exposed to less light and thus rendered partially insoluble, instead of remaining solid upon the web, are preforated, the perforations being of a size and proximity proportioned to the degree of light to which the coating has been subjected in the printing. These characteristics are in a great measure apparent to the eye when the washed film or web is viewed by transmitted light, but the gradation of the perforations corresponds so exactly or approximately to the degrees of shade or tone that the effect produced when the web, has been printed and washed, does not fully appear to the eye.

In the ordinary and most advantageous method of producing the web or pervious film for the purposes for which our invention is adapted the sensitized web is exposed to the action of light under a photographic positive or transparency, so that after washing out the soluble portions the high lights of the transparency are represented on the web or stencil by the insoluble coating, the deepest shades or blacks by the entirely open work on the web and the medium shades or half tones by the partially washed out and finely perforated portions of the gelatinous film of the web. The effect of light of different degrees of intensity, such as would be allowed to pass through a photographic negative or transparency, is to produce such a difference in the film or web between the portions corresponding to the different depths of shade of the negative or transparency that when the web is used as a stencil and coloring matter carefully passed through it, the effect will be a photo-mechanical print or impression having the characteristics of light and shade of the object from which the photograph was originally taken. The netting, aside from its use as a supporting medium for the gelatinous film, serves incidentally and very effectually to break up the lights and shadows, so that a print or impression, resulting from the practice of a process in which a fabric or net work is employed, bears a striking similarity to the half tone work of zinc or copper plates.

Figure 2:
Figure 3:
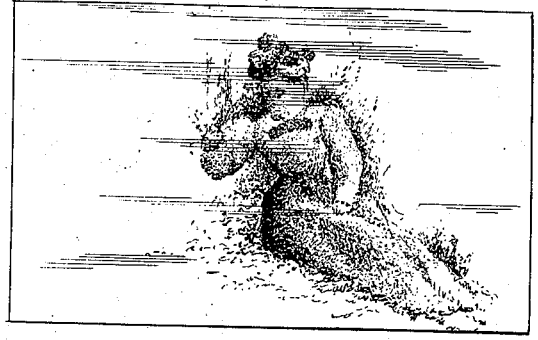

Referring now to the accompanying drawings which are intended to illustrate so much of our invention as is capable of pictorial representation, Figure 1 is a face view of a pervious photographic web or stencil produced according to the process described, Fig. 2 is a plan view of a hectograph bearing the imprint or impression produced by the use of the photographic stencil shown in Fig. 1, and Fig. 3 is a representation of the print or impression taken from the hectograph.

We have found silk bolting cloth of very fine regular mesh to be the best, easily available material for use as a web or foundation sheet for a photographic stencil. The material which we have found most serviceable and easily managed as a coating for the bolting cloth is bichromatized fish glue, such as Le Pages liquid glue, which may be sensitized with bichromate of potash or bichromate of ammonia.

We have been accustomed in our experiments to simply coat bolting cloth with the bichromatized glue by means of a brush, taking care to fill all the interstices of the cloth, so that when the film is dry the interstices of the bolting cloth will be entirely filled with sensitized glue. In coating the cloth, however, in a factory other means will be provided for the purpose of evenly coating the surface and filling all the interstices. After the bolting cloth is coated and dried, it is exposed under the photographic plate, film or sheet, preferably a photographic positive or transparency and printed in the usual way, as in printing a film for half tone work or for photo-lithographic purposes. A suitable actinometer may be used to determine the amount of printing to which the film is subjected, or this may be determined according to the judgment and experience of the printer. After removal of the film from the printing frame it is washed in water, preferably slightly warm or tepid, until so much of the soluble portions of the film is washed out as to leave a sufficiently perfect stencil for further operations.

We have been accustomed after washing the film to subject it to a bath consisting of a solution of bichromate of potash or bichromate of ammonia, sometimes using chrome alum to harden the film and to then expose the fully developed negative stencil or cliché to the action of sun-light, so as to render hard and insoluble to the greatest degree such portions of the film as may not have been rendered wholly insoluble in the printing operation. The web or cliché during this hardening or baking operation may be held in a stretching frame or it may after hardening be smoothed or evened out by means of a flat iron or heated burnishing rollers, or by any other means which will thoroughly flatten and smooth the web. The photographic stencil is now in a condition to be applied to the hectograph which, having been properly moistened, will allow the stencil to adhere strongly and evenly to its surface. All that is now required is to apply to the stencil a suitable pigment or coloring material, and we have found that anilin dye powders are the most serviceable and convenient and give the best results. The anilin powder used as a material wherewith to charge or supply the hectograph is conveniently passed through the stencil by means of a soft brush or by pouring the powder upon the upper surface of the stencil and agitating it slightly or by blowing the powder against the surface of the web.

We have found that fine powdered colors will pass readily through extremely fine perforations in the stencil and produce upon the hectograph a picture more or less perfect according to the character of the stencil and the skill and judgment employed by the operator. After the stencil has been applied to the hectograph and coloring matter passed through it, the stencil is lifted from the hectograph and the latter then used in giving impressions by simply laying upon its surface a sheet of paper, pressing the paper upon the inked picture and then removing it. By the use of appropriate coloring matter many impressions may be taken from the hectograph without reinking. When the hectograph is exhausted of coloring matter it may be washed and the stencil again applied, or, if it is desirable to take a number of impressions upon a single sheet of paper, or upon several sheets of paper at a time, the stencil may be applied successively to different portions of the surface of the hectograph, and a number of impressions made thereon.

We have found that a gelatinous, or glutinous, or other plastic film, when properly prepared and treated, has remarkable tenacity and durability and after being used may be washed and used again and again with but comparatively little, if any, deterioration. By applying coloring matter or powder of different colors to different parts of the stencil and carefully outlining and dividing off the different portions of the picture attractive effects may be produced in different colors depending upon the skill and artistic judgment of the colorist. If a negative stencil is used for the shaded portions of the picture a positive stencil may be used in addition thereto, and the light or local colors passed through the latter, it being understood that when the negative stencil is used those portions of this stencil which correspond to the high lights of the picture will be practically impervious to the passage of coloring matter. The positive stencil, which is applied to the hectograph after the negative stencil has been utilized, has those portions corresponding to the high lights open, and hence the coloring matter for the high lights can be passed therethrough to the hectograph.

We have suggested the use of a photographic positive or transparency from which to print the web of which the stencil is made, as the portions of the stencil corresponding to the transparent portions of the photographic plate or film become the solid portions of the stencil and by resisting the passage of the coloring matter to the hectograph leave the portions of the hectograph under said solid portions of the stencil free from color. We may, however, by a modification of the process described use an ordinary photographic negative from which to print a stencil and thus produce what may be termed a positive stencil, the stencil as previously described being relatively a negative stencil. In using such positive stencil, we do not pass coloring matter through the stencil, but we first apply coloring matter to the hectograph, then apply the stencil or web and then pass through the interstices of the stencil a material such as soapstone which will cover or shield certain portions of the inked surface of the hectograph and thus produce by the distribution of the soapstone a picture upon the hectograph from which impressions may be taken as previously described. The soapstone has the effect of preventing the inked or coloring matter over which it lies from being taken up by the paper on which the impressions are made and these impressions are consequently positives, having characteristics slightly different from prints produced by the first described process.

The most apparent characteristic of such prints is the toning down of the lights occasioned by the fact that the threads of a stencil fabric prevent the soapstone from touching or overlaying the coloring matter upon the hectograph under such threads. As will be observed in Fig. 3 of the drawings, the prints produced by our process as first described are made up of points or dots of color corresponding to the perforations or interstices of the stencil and appearing very similar to certain kinds of half tone work produced by the use of screens. In our process the bolting cloth or netting in a great measure supplies the purpose of a screen, such as used in photo-mechanical printing, but we have found it advantageous in some cases to use a screen, either by interposing a suitable screen between the sensitized stencil film and the negative or transparency, or by taking the negative or transparency with the aid of a screen in a camera in the usual way known to and practiced by photo-mechanical printers. The use of the screen produces better distribution of the shades and prevents too great density in the shades and too great intensity in the high lights.

1. The art of producing pictorial representations, consisting in subjecting a sensitized sheet to the action of light through a positive of the object to be copied to produce an image, then removing a portion of the sheet then hardening the sheet and then passing coloring matter through the interstices so formed onto a suitable receptive surface.

2. The art of producing photo mechanical prints or impressions, consisting in subjecting a photo sensitized sheet or web to the action of light under a photographic positive to produce an image, than dissolving the soluble portions of the sheet then resensitizing the sheet and hardening the same, and then passing coloring matter through the interstices of the sheet onto a receptive surface.

3. The art of producing photo mechanical prints or impressions, consisting in subjecting a photo sensitized sheet or web to the action of light to produce an image, then dissolving the soluble portions of the sheet, and then passing coloring matter through the interstices of the sheet onto a receptive surface and then printing the prints or impressions from said surface.

4. The art of producing photo mechanical or pigment prints or impressions, which consists in producing by photographic agency a web or sheet bearing an image to be printed, applying said sheet to a suitable receptive surface for pigment, conveying soluble pigment or coloring matter to the said receptive surface by means of said sheet and then taking impressions of the photographic image in said pigment from the surface upon which it has been laid and from the one charge of color or pigment.

5. The art of producing photo mechanical or pigment prints or impressions, which consists in inking a hectograph to correspond with the print or impression, through the medium of a photographically exposed and developed inking sheet, and then taking impressions from said hectograph.

6. In photo mechanical or pigment printing, the process of duplicating prints consisting in impressing a photo image in soluble color or pigment upon the surface of a body containing a suitable solvent of said color or pigment, then taking impressions therefrom by the application and removal of the sheet upon which the print is to be taken without further inking or charging.

7. The process of producing hectographic copies, consisting in first making a stencil of the matter to be copied, applying this stencil to a hectographic surface, applying a hectographic color upon the exposed side of the stencil, and then making copies from the hectographic surface in the usual manner.

In testimony whereof we have signed our names to this specification in the presence of two subscribing witnesses.

THOMAS A. CONNOLLY.
JOSEPH B. CONNOLLY.

Witnesses:
  I. HIMES,
  W. E. WRIGHT.